United States Patent [19]

Kulik et al.

[11] Patent Number: 5,678,064
[45] Date of Patent: Oct. 14, 1997

[54] LOCAL BUS-ISA BRIDGE FOR SUPPORTING PIO AND THIRD PARTY DMA DATA TRANSFERS TO IDE DRIVES

[75] Inventors: Amy L. Kulik; Patrick Maurice Bland, both of Austin, Tex.; Dennis Moeller, Boca Raton, Fla.; William Alan Wall, Austin, Tex.; Sagi Katz, Haifa, Israel; Suksoon Yong, Austin, Tex.

[73] Assignee: International Business Machines Corporation, Armonk, N.Y.

[21] Appl. No.: 352,131

[22] Filed: Dec. 1, 1994

[51] Int. Cl.$^6$ .................................................. G06F 13/14
[52] U.S. Cl. ........................................... 395/848; 395/309
[58] Field of Search ................................. 395/250, 281, 395/293, 306, 307, 308, 309, 550, 844, 846, 847, 848, 842

[56] References Cited

U.S. PATENT DOCUMENTS

| | | | |
|---|---|---|---|
| 5,220,651 | 6/1993 | Larson | 395/250 |
| 5,416,907 | 5/1995 | Polzin et al. | 395/886 |
| 5,438,666 | 8/1995 | Craft et al. | 395/842 |
| 5,450,551 | 9/1995 | Amini et al. | 395/299 |
| 5,535,419 | 7/1996 | O'Brien | 395/856 |
| 5,557,757 | 9/1996 | Gephardt et al. | 395/306 |
| 5,557,758 | 9/1996 | Bland et al. | 395/308 |

*Primary Examiner*—Glenn A. Auve

[57] ABSTRACT

A method and arrangement is provided to support both fast Programmed Input/Output (PIO) and third party Direct Memory Access (DMA) data transfers between a system memory and Integrated Drive Electronics (IDE) drives. A DMA controller attached to an ISA bus supplies address, read and write signals in third party DMA data transfers. An IDE controller provides control signals to support the DMA data transfers. The IDE controller additionally provides address and control signals to support the PIO data transfers at local bus speeds. A local bus-ISA bridge is incorporated to support the system memory that resides on the local bus. An arbitration circuit arbitrates access to the ISA bus, and allows the IDE controller to seize the ISA bus for fast PIO data transfer.

8 Claims, 4 Drawing Sheets

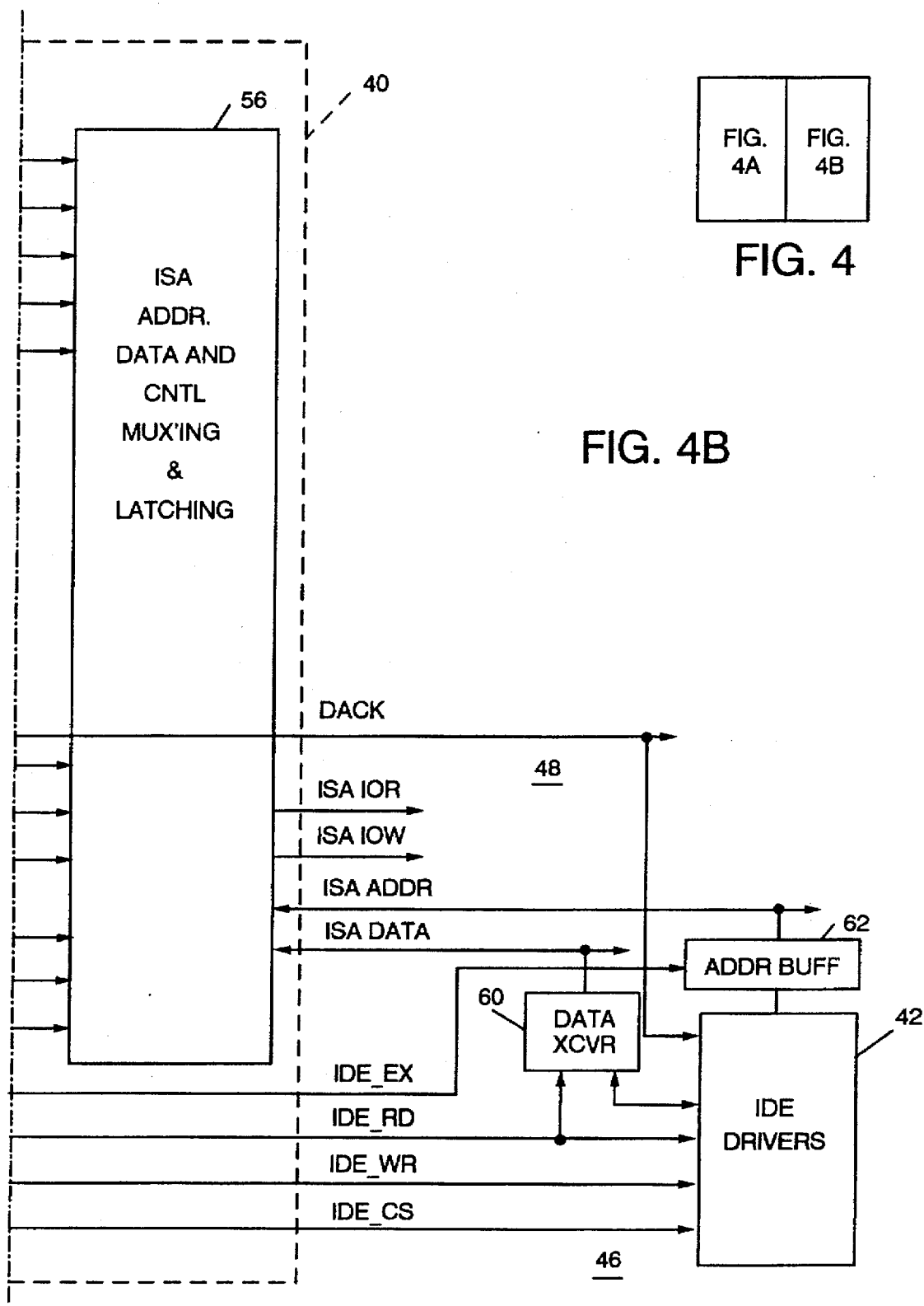

LOCAL BUS-ISA BRIDGE FOR SUPPORTING PIO AND THIRD PARTY DMA DATA TRANSFERS TO IDE DRIVES

BACKGROUND OF THE INVENTION

1. Field of the Invention

The present invention relates to the field of digital computer systems, and more particularly, to a bridge between a local bus and an ISA bus to support both fast Programmed Input/Output (PIO) transfer and third party Direct Memory Access (DMA) transfer between a system memory and Integrated Drive Electronics (IDE) drives.

2. Description of Related Art

In computer systems, electronic chips and other components are connected with one another by buses. A variety of components can be connected to the bus, providing intercommunication between all of the devices that are connected to the bus. One type of bus which has gained wide industry acceptance is the industry standard architecture (ISA) bus. The ISA bus has twenty-four (24) memory address lines which therefore provides support for up to sixteen (16) megabytes of memory. The wide acceptance of the ISA bus has resulted in a very large percentage of devices being designed for use on the ISA bus. However, high-speed input/output devices commonly used in computer systems require faster buses. A solution to the general problem of sending and receiving data from the processor to any high input device is a local bus. Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the local bus. Other devices such as graphic display adapters, disk controllers, sound cards, etc. can also be attached directly or indirectly (e.g., through a host bridge) to the PCI bus.

A bridge chip is provided between the local bus and the ISA bus in order to provide communication between devices on the two buses. The bridge chip essentially translates the ISA bus cycles to local bus cycles, and vice versa.

Transfers between memory and Input/Output (I/O) devices are normally provided either in a "PIO mode", wherein the system processor is involved in every I/O data transfer, or in a "DMA mode" of data transfer using a DMA controller. The DMA mode allows the processor to continue to execute instructions from its prefetch queue or cache while transfers are being made between an I/O device and memory. When using DMA to transfer a block of information between an I/O device and memory, the processor must still initiate the block data transfer, but the actual data transfer and its termination are handled solely by the DMA controller. Once a DMA block data transfer has been initiated, the DMA controller and the I/O device do not disturb the processor again until the entire block of data has been transferred.

In an ISA computer system, a DMA controller performs a "fly-by" transfer, that is, it is able to transfer data between memory and an I/O device (read and write) in a single DMA cycle without latching the data internally. This job would normally require two separate bus cycles (a read operation followed by a write operation) performed by the processor.

FIG. 1 shows an example of a DMA transfer in a prior art ISA computer system. The DMA controller, for example, an Intel 8237, can provide four separate DMA channels, each of which is used by a separate I/O device to handle block data transfers with memory. For example, as shown in FIG. 1, the DMA controller 2 provides a DMA data transfer between a drive controller 4 and dynamic random access memory (DRAM) 6 using one of the DMA channels. The DMA channel is setup by the programmer (the CPU 10) that issues a series of I/O writes to DMA channel's registers to store up a starting memory address, a transfer count (number of bytes to be transferred) and the direction of the transfer with reference to the memory.

When the first byte has been transferred from a disk drive 8 to the drive controller 4, the latter asserts DMA request (DREQ) to the DMA controller 2. In response, the DMA controller 2 asserts a hold request signal (HOLD) to seize address, data and control buses from the CPU processor 10. When the CPU 10 processor completes the current bus cycle, it asserts HLDA to inform the DMA controller 2 that its request is granted. The DMA controller 2 responds by sending DMA acknowledge (DACK#) and I/O read command (IOR#) to the drive controller 4. The drive controller 4 gates the data to a data bus 12 to the DRAM memory 6 and drops the DMA request DREQ.

Simultaneously, the DMA controller 2 activates a Memory Write Command Line (MWTC#) and places the address from the DMA channel's starting memory address register onto the address bus 14. As a result, the data on the data bus 12 is written into the memory at the address currently on the address bus 14.

The DMA controller 2 then increments the DMA channel's current memory address register by one to point to the address in the DRAM where the DMA controller 2 will store the next byte it receives from the drive controller 4. Also, the DMA controller 2 decrements the transfer count by one byte.

When the transfer count is exhausted, the data transfer is complete, and the DMA controller 2 deactivates the HOLD signal to inform the processor 10 that it no longer needs the buses. The DMA controller 2 also supplies a Terminal Count (TC) signal to the drive controller 4 to indicate the end of the process. In response, the drive controller 4 sends a device-specific interrupt request (IRQ) to an interrupt controller 16, which in turn generates an interrupt request (INTR) to the processor 10 to inform it that the DMA transfer operation is complete.

The DMA data transfer described above using the DMA controller 2 is an example of a "third party" DMA transfer that is supported by a standard ISA DMA controller. This type of DMA transfer involves a DMA controller that is subject to external programming (via the CPU, for example) to initiate a data block DMA transfer.

By contrast, a "first party" DMA transfer is defined as a DMA process controlled by an external bus master on the ISA bus or local bus so that external programming is not required to initiate a DMA transfer. The bus master is a more intelligent device than the DMA controller and is able to conduct processing independent of the bus or other devices. The majority of the time, the processor on the system board serves as the bus master in ISA computer systems. It is also possible, however, for a card inserted into an ISA expansion slot to become a bus master. In a first party DMA transfer, the ISA bus master uses the DMA controller to arbitrate for control of the system buses. The ISA bus master, which may be attached to one of the DMA channels of the DMA controller, initiates a DMA transfer by requesting the use of the buses to access I/O devices.

Until recently, most of the intelligence for moving data back and forth from the computer to a hard drive was located on the computer card in the computer. Consequently, in order to add a new hard disk or replace an existing drive, the computer's disk controller had to be completely compatible with the new hard disk drive. To make the hard disk drive to computer interface more flexible, Integrated Drive Electronics (IDE) disk drives are now often used. On an IDE disk drive, the disk controller is part of the disk drive's logic board and assumes a larger role in data transfers, so the actual interface between the drive and the computer can be relatively simple. This simplifies the electronics inside the computer and allows drive manufacturers more flexibility in design of the electronics for drives.

The IDE rates in a PIO data transfer (up to 22 MBytes/sec) are far above the ISA 16 bit I/O data transfer rate (5.3 Mbytes/sec). To take advantage of these speeds, IDE drives are typically attached to a "private" bus rather than to a relatively slow ISA bus. On the other hand, although a third party DMA transfer is slower than a PIO data transfer, it is preferable in certain system implementations because it does not utilize bandwidth of a processor, unlike a PIO data transfer.

The use of a private bus for fast PIO data transfers precludes the ability of the IDE drive to support third party DMA transfers that are performed on the ISA bus, and accordingly, require an ISA bus interface in order to be supported. Similarly, support of third party DMA data transfers on the ISA bus precludes the fast PIO transfers.

SUMMARY OF THE INVENTION

In view of the foregoing, it is desirable to provide a flexible system that supports both PIO and third party DMA data transfers between the memory and IDE drives. Such a system would enable IDE drives to take advantage of the PIO or DMA data transfer mechanism depending on which mechanism is preferable for the system implementation.

Accordingly, one advantage of the invention is in providing a flexible hardware system that supports both PIO and third party DMA data transfers between the memory and IDE drives.

Another advantage of the invention is in enabling IDE drives to take advantage of either the PIO or DMA data transfer mechanism depending on which mechanism is preferable for the system implementation.

The above and other advantages of the invention are achieved, at least, in part, by providing a system for supporting data transfer between a system memory and an IDE drive. The system comprises a DMA controller attached to an ISA bus for providing a third party DMA data transfer between the system memory and the IDE drive via the ISA bus. An IDE controller responsive to a local bus provides PIO data transfer between the system memory and the IDE drive at the local bus speeds, and supports the DMA data transfer.

In accordance with one aspect of the invention, the data transfer system supports the system memory attached to the ISA bus.

In accordance with another aspect of the invention, the system memory resides on the local bus. In this case, a local bus-ISA bridge is involved to provide the DMA data transfer.

In accordance with a further aspect of the invention, the ISA address and data lines are used for both fast PIO and third party DMA data transfer.

Preferably, an arbitration circuit is used to arbitrate access to the ISA bus, and to allow the IDE controller to seize the ISA address and data lines for fast PIO transfers.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING(S)

DESCRIPTION OF THE ILLUSTRATIVE EMBODIMENT(S)

Figure 2:
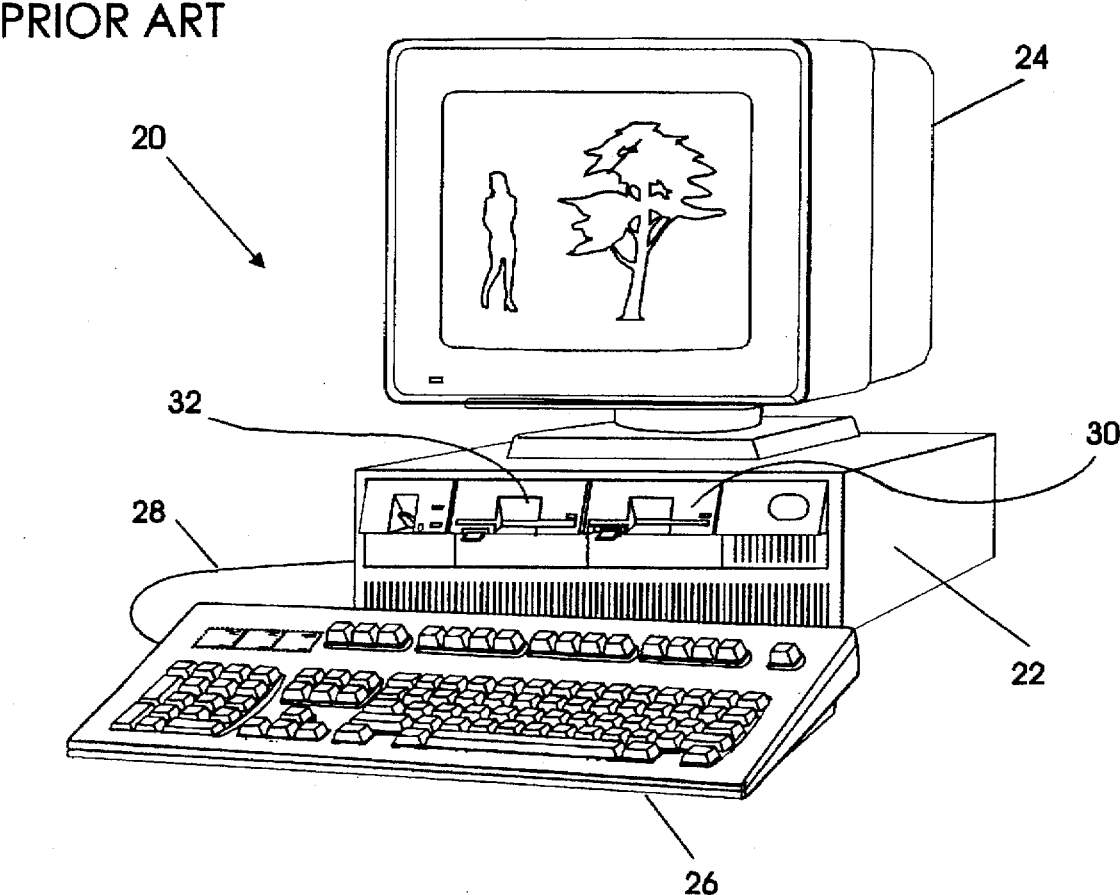
FIG. 2 is a perspective view of a computer system in accordance with the present invention.

With reference now to the Figures and in particular with reference to FIG. 2, a conventional computer, or PC, designated 20, is of the environment to which the invention has particular utility. Computer 20 which preferably, but not necessarily, is of a type utilizing an IBM personal computer or a similar system, includes a console housing 22 in which a system board containing the necessary circuitry including a processor and BIOS chips, controllers, random access memory and other hardware are arranged. The computer will also include a video display 24 and a keyboard 26 connected to the housing 22 through cable 28. Mass storage media includes one or several IDE disk drives within the housing and is non-accessible to the user, and user-accessible floppy disks, as well as, optionally, CD-ROM drives 30 and 32.

Figure 3:
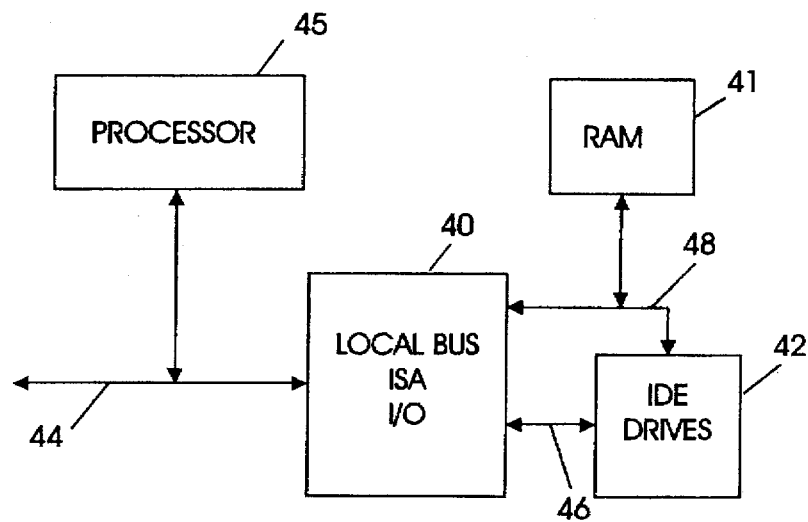
FIG. 3 is a block diagram illustrating interconnection between IDE drives, processor and memory in accordance with the present invention.

Referring to FIG. 3, the system board contains a Local Bus-ISA I/O bridge chip 40 that provides support for both fast PIO and third party DMA data transfers between the random access memory 41 and the IDE disk drives 42. In alternative embodiments, logic blocks of the data transfer support circuit are implemented as separate devices on the system board. In certain embodiments some of the logic blocks are incorporated into the bridge chip 40 and the remainder are implemented as separate devices on the system board.

A local bus 44, for example, a PCI or a Video Electronics Standards Association (VESA) bus, couples the chip 40 to the processor 45. A bridge may be provided to connect the processor 45 to the local bus 44 or, the processor may be attached directly to the local bus 44. The chip 40 interacts with the IDE drives 42 via a private bus 46 and an ISA bus 48. The memory 41 may reside on the ISA bus 48, or alternatively, may be attached to the local bus 44. It is to be understood that the invention is applicable not only to IDE drives but to any I/O devices residing on any type of a private bus. For example, a PCI or VESA bus may be used as the private bus.

Figure 4A:
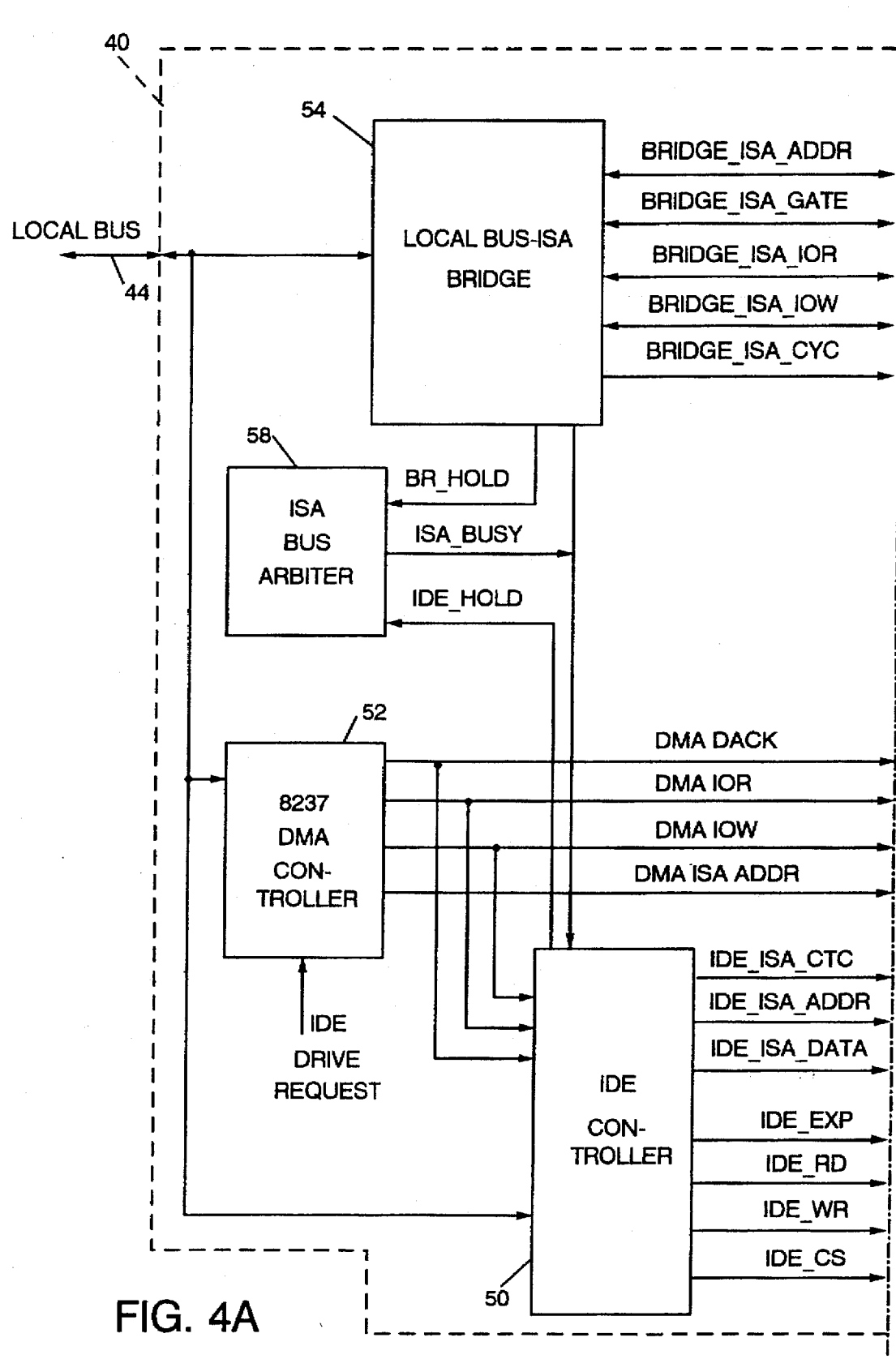
FIG. 4 shows a diagram of the system for supporting data transfer in accordance with the present invention.

As shown in FIG. 4, the chip 40 comprises a DMA controller 52 residing on the ISA bus 48. The Intel 8237

Figure 1:
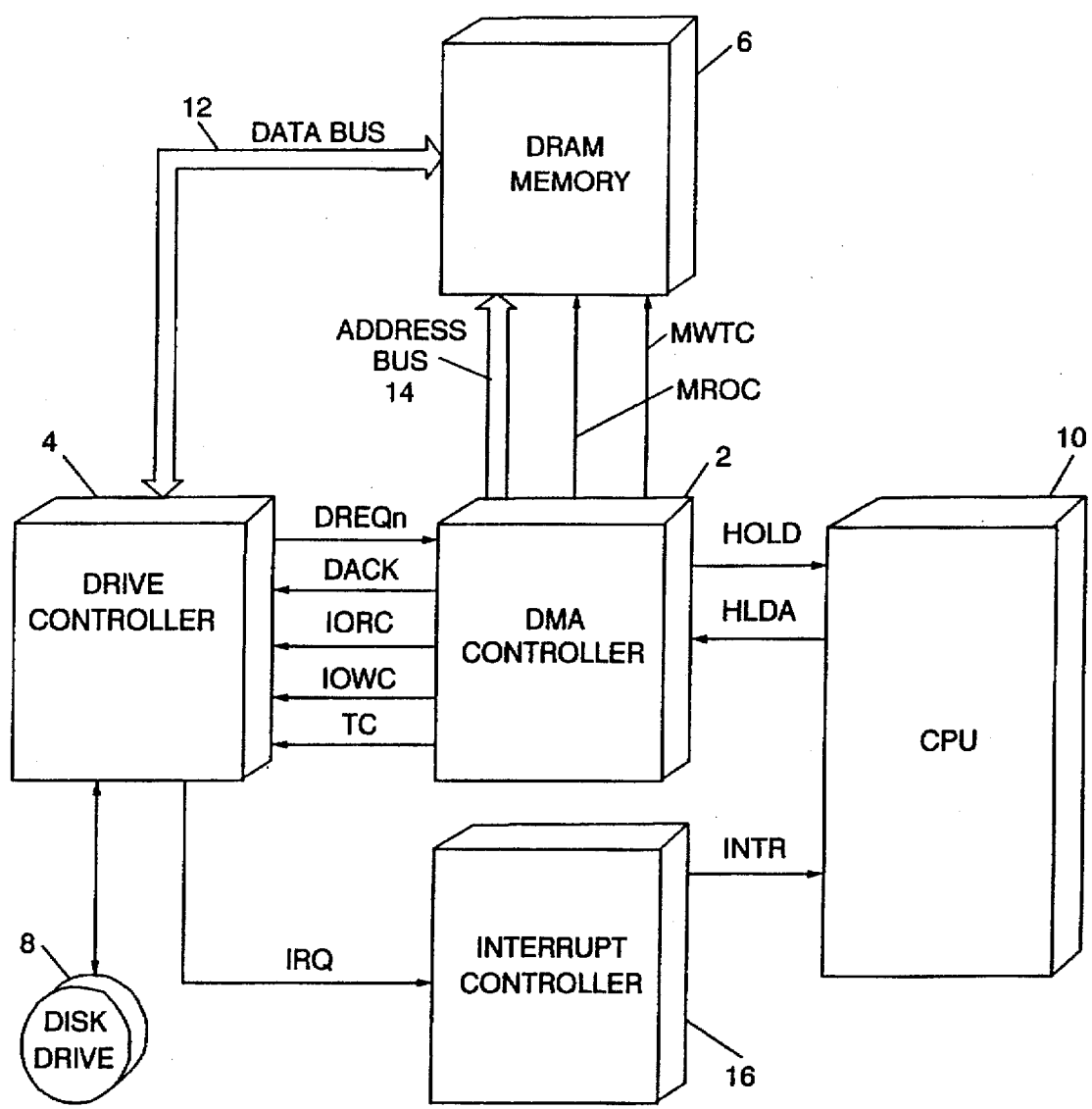
FIG. 1 shows an example of a third party DMA data transfer according to the prior art.

DMA controller presented in FIG. 1 may be used. Alternatively, the DMA controller 52 may be implemented by any DMA controller able to provide a third party DMA transfer in an ISA system.

The access to the IDE drives 42 is managed by an IDE controller 50 that provides an interface between the local bus 44 and the private bus 46 used by the IDE drives 42. As discussed above, the data transfer support circuit 40 may support one or several IDE drives 42. The IDE controller 50 uses a chip select line IDE CS#s to select the IDE drive for PIO data transfer.

A local bus-ISA bridge 54 supports DMA interaction between the IDE drives 42 and the memory 41, if the latter resides on the local bus 44. If the memory 41 is on the ISA bus 48, the data transfer does not require the bridge 54. A multiplexing and latching circuit 56 provides multiplexing and latching address, data and control signals supplied by the DMA controller 52, IDE controller 50 and local bus-ISA bridge 54 to the IDE drives 42. Also, the circuit 56 provides support for transferring address, data and control signals via the bridge 54 to the memory.

An ISA bus arbiter 58 arbitrates access to the ISA bus 48. A local bus slave that requests access to the ISA bus 48 is guaranteed by the arbiter 58 to be the next ISA bus owner if it is the target of the current bus master cycle. The ISA arbitration is provided by handshaking request signals BR-HOLD and IDE_HOLD supplied to the arbiter 58 and ISA BUSY signal asserted by the arbiter. The ISA BUSY signal is asserted when the ISA bus 48 is seized. When the current bus master cycle is completed, the arbiter deasserts the ISA BUSY signal. The local bus slave monitors the ISA BUSY line, and when its signal is deasserted, supplies the arbiter with a HOLD signal to seize the ISA bus. In particular, as shown in FIG. 4, the IDE controller 50 and the bridge 54 are connected to the arbiter 58 by the corresponding ISA_BUSY and HOLD lines to be able to seize the ISA bus 48. When the IDE controller 50 gain access to the ISA bus, it asserts a cycle signal in an IDE ISA CYC line. When the bridge 54 seizes the ISA bus 48, it asserts a cycle signal in a Bridge_ISA_CYC line. The circuit 56 supplies the corresponding cycle signal to the ISA bus 48.

A data transceiver 60 is provided on the data lines of the ISA bus 48 to provide data transmission to or from the IDE drives 42. The data transceiver 60 has two control lines that allow the IDE controller 50 to control its action. A read control signal IDE_RD# from the IDE controller 50 places the data transceiver 60 in a data transmit or receive mode to respectively transmit or receive data to or from the IDE drives 42. A Data Enable signal IDE_EN#s from the IDE controller 50 enables the transceiver 60 to actually pass the data in the direction selected by the state of the IDE_RD# line.

An address buffer 62 is provided on the address lines of the ISA bus 48. When an IDE drive address is provided on the ISA bus 48, the IDE controller 50 commands the address buffer 62 through the IDE_EN#s signal to supply the address to the IDE drives 42. In certain embodiments, the data transfer support is implemented without the data transceiver 60 and address buffer 62.

A third party DMA data transfer between the memory and the IDE drives 42. is carried out as follows. In response to a DMA transfer request from the IDE drives 42, the DMA controller 52 activates DMA Acknowledge on line DMA DACK#s. The IDE controller 50 monitors the signal on DMADACK#s for the specific DACK# with which it has been programmed. When the corresponding DMA DACK# signal is asserted, the IDE controller 50 asserts the IDE_EN#s signal that enables the data transceiver 60 and address buffer 62 to allow propagation of address (ISA ADDR) and data (ISA DATA) signals provided on the ISA bus 48 to the IDE drives 42.

It should be noted that the ISA DATA is provided on the ISA bus 48 by the IDE drives 42 or the memory depending on the direction of the DMA transfer (as in the third party DMA transfer illustrated in FIG. 1). The ISA ADDR is provided on the ISA bus 48 by the DMA controller 46 (on DMA ISA ADDR line) through the circuit 56.

Via DMA IOR# and DMA IOW# lines, the DMA controller 52 supplies the circuit 56 and the IDE controller 50 with a DMA read or write control signal. The DMA read or write control signal is transferred via ISA bus 48 (ISA IOR# and ISA IOW# lines) to the memory, and via the private bus 46 (IDE_RD# and IDE_WR# lines) to the IDE drives 42. The IDE controller 50 keeps IDE CS#s deasserted, as required by the IDE drives 42 for DMA transfer.

If the memory 41 is on the local bus 44 rather than on the ISA bus 48, the local bus-ISA bridge 54 is used to transfer data, address and control signals between the ISA bus 48 and local bus 44. In particular, the ISA DATA, ISA ADDR, ISA IOR# and ISA IOW# lines are coupled through the circuit 56 with Bridge_ISA_DATA, Bridge_ISA_ADDR, Bridge_ISA_IOR# and Bridge_ISA_IOW# lines of the bridge 54 to the local bus 44.

A fast PIO data transfer between the memory and IDE drives 42 is supported by the invention as follows. The PIO data transfer is initiated via the local bus 44 by the processor or other local bus master that supplies the IDE controller 50 with a read or write control signal. Upon seeing the ISA BUSY signal from the ISA bus arbiter 58 deasserted, the IDE controller 50 provides the IDE_HOLD signal to the arbiter 58, which in turn asserts the ISA_BUSY signal to prevent other devices from simultaneously accessing the ISA bus 48. The IDE controller 50 supplies the IDE_ISA_CYC signal onto the ISA bus 48 to support the bus master cycle.

The IDE controller 50 generates the appropriate address and control signals to provide the data transfer between the processor (or other local bus master) and the IDE drive 42 through the IDE controller 50 and the ISA bus 48. More specifically, the IDE drives 42 are attached to the ISA DATA line through the data transceiver 60, which in turn is coupled through the circuit 56 to the IDE_ISA_DATA line of the IDE controller 50.

To support the data transfer, the IDE controller 50 generates address signals (IDE_ISA_ADDR) supplied through the circuit 56 onto the ISA bus 48 (ISA_ADDR line). Through the address buffer 62, the address signals are provided to the IDE drives 42. As discussed above, the IDE controller 50 provides the enable signal (IDE EN#s line) to control the address buffer 62 and the data transceiver 60. Also, the IDE controller 50 supplies the IDE drives via the private bus 46 with the chip select signal (IDE_CS#s line) to select one of the IDE drives 42, and with the read or write control signal (IDE_RD# and IDE_WR# lines, respectively) to provide reading or writing operation.

Accordingly, the disclosed data transfer support circuit provides both fast PIO data transfer at local bus speeds and DMA transfers, and enables IDE drivers to take advantage of either PIO or DMA data transfers depending on which mechanism is preferable for the system implementation.

In this disclosure, there are shown and described only the preferred embodiments of the invention, but it is to be understood that the invention is capable of changes and modifications within the scope of the inventive concept as expressed herein.

What is claimed is:

1. In a computer system having a processor and a memory interacting with at least one I/O device via a private bus, a bridge between system buses for supporting data transfers between said memory and said I/O device, said computer system comprising:
- a DMA controller responsive to said I/O device or generating a first DMA control signal directly to said I/O device to provide a DMA data transfer between said memory and said I/O device; and
- an I/O controller responsive to said DMA controller for supplying a second DMA control signal via said private bus to said I/O device to control said DMA data transfer, said I/O controller being responsive to said processor for providing a PIO data transfer between said memory and said I/O device;
- wherein said DMA transfer is performed on an ISA bus, and wherein said memory resides on a local bus.

2. The bridge of claim 1 further comprising a local bus-ISA bridge to provide the DMA data transfer between said memory and said I/O device.

3. A system for providing data transfer between a system memory and at least one I/O device attached to a private bus, said system comprising:
- a DMA controller attached to an ISA bus for providing a DMA data transfer between said system memory and said I/O device via said ISA bus; and
- an I/O controller responsive to a local bus for providing a PIO data transfer between said system memory and said I/O device using said private bus, said I/O controller providing control signals to support the DMA data transfer;
- wherein said system memory resides on said local bus.

4. A system for providing data transfer between a system memory and at least one I/O device attached to a private bus, said system comprising:
- a DMA controller attached to an ISA bus for providing a DMA data transfer between said system memory and said I/O device via said ISA bus; and
- an I/O controller responsive to a local bus for providing a PIO data transfer between said system memory and said FO device using said private bus, said I/O controller providing control signals to support the DMA data transfer;
- wherein said I/O controller provides said I/O device with control signals via said private bus, and with the address signals via said ISA bus.

5. A computer system comprising:
- a first bus;
- a second bus;
- a bridge circuit coupled between said first and second buses;
- a DMA controller coupled between said first and second buses;
- an I/O controller coupled to said first bus;
- an I/O device;
- a third bus coupled between said I/O controller and said I/O device;
- a data transceiver and an address transceiver coupled between said second bus and said I/0 device;
- a direct connection between said DMA controller and said I/0 device for passing control signals between said DMA controller and said I/0 device.

6. The computer system of claim 5, further comprising:
- a memory coupled to said second bus;
- wherein, during a third party DMA transfer between said memory and said I/O device, said DMA controller sends a control signal to said I/O device; said I/O controller enables said data and address transceivers; said DMA controller places a series of addresses on said second bus, which are coupled to said I/O device through said address transceiver; and data flows between said memory and said I/O device via said data transceiver and said second bus.

7. The computer system of claim 5, further comprising:
- a memory coupled to said first bus;
- wherein, during a third party DMA transfer between said memory and said I/O device, said DMA controller sends a control signal to said I/O device; said I/O controller enables said data and address transceivers; said DMA controller places a series of addresses on said second bus, which are coupled to said I/O device through said address transceiver; and data flows between said memory and said I/O device via said data transceiver, said second bus, said bridge circuit and said first bus.

8. The computer system of claim 5, further comprising:
- a bus master coupled to said first bus;
- wherein said I/O controller is further coupled to said second bus; and
- wherein, during a programmed I/O ("PIO") transfer of data, data is transferred between said bus master and said I/O device via said data transceiver, said second bus, said I/O controller and said first bus.

* * * * *